United States Patent
Tajima et al.

(10) Patent No.: US 10,816,407 B2
(45) Date of Patent: Oct. 27, 2020

(54) RADIOMETRY DEVICE

(71) Applicant: Inter-University Research Institute Corporation High Energy Accelerator Research Organization, Tsukuba-shi, Ibaraki (JP)

(72) Inventors: Osamu Tajima, Tsukuba (JP); Taketo Nagasaki, Tsukuba (JP)

(73) Assignee: INTER-UNIVERSITY RESEARCH INSTITUTE CORPORATIONHIG, Tsukuba-shi (JP)

( * ) Notice: Subject to any disclaimer, the term of this patent is extended or adjusted under 35 U.S.C. 154(b) by 188 days.

(21) Appl. No.: 16/076,753

(22) PCT Filed: Feb. 8, 2017

(86) PCT No.: PCT/JP2017/004639
§ 371 (c)(1),
(2) Date: Aug. 9, 2018

(87) PCT Pub. No.: WO2017/138579
PCT Pub. Date: Aug. 17, 2017

(65) Prior Publication Data
US 2019/0049310 A1    Feb. 14, 2019

(30) Foreign Application Priority Data
Feb. 9, 2016    (JP) .................. 2016-022689

(51) Int. Cl.
| | | |
|---|---|---|
| G01J 5/00 | (2006.01) | |
| G01K 15/00 | (2006.01) | |
| G01K 1/00 | (2006.01) | |
| G01J 5/46 | (2006.01) | |
| G01J 5/10 | (2006.01) | |
| G01J 5/58 | (2006.01) | |
| G01J 5/60 | (2006.01) | |
| G01J 5/02 | (2006.01) | |
| G01J 5/08 | (2006.01) | |
| G01J 5/06 | (2006.01) | |
| G01J 5/52 | (2006.01) | |

(52) U.S. Cl.
CPC ............... *G01J 5/46* (2013.01); *G01J 5/0003* (2013.01); *G01J 5/02* (2013.01); *G01J 5/0285* (2013.01); *G01J 5/061* (2013.01); *G01J 5/0825* (2013.01); *G01J 5/10* (2013.01); *G01J 5/522* (2013.01); *G01J 5/58* (2013.01); *G01J 5/60* (2013.01); *G01J 5/602* (2013.01); *G01J 2005/586* (2013.01)

(58) Field of Classification Search
USPC ......................................... 374/121, 1, 2, 208
See application file for complete search history.

*Primary Examiner* — Mirellys Jagan
(74) *Attorney, Agent, or Firm* — Westerman, Hattori, Daniels & Adrian, LLP

(57) ABSTRACT

The present invention separates radiation from an object by a polarization filter 3 into polarized light beams, causes one of the beams to enter a spectrum analyzer 7 through a first optical path, causes the other to enter the spectrum analyzer 7 through a second optical path, and measures the two-color ratio, while causes radiation of a blackbody 2 placed in a vacuum ultralow temperature thermostatic chamber 1 in a quasi-thermal equilibrium state at an ultralow temperature in vacuo to enter the polarization filter 3 through a third optical path, separates the radiation into polarized light beams, causes the beams to each enter the same optical paths as the respective optical paths for the radiation of the object, causes the beams to enter the spectrum analyzer 7, measures the two-color ratio, and accurately obtains the temperature of the object on the basis of these two two-color ratios.

4 Claims, 4 Drawing Sheets

[Fig.1]
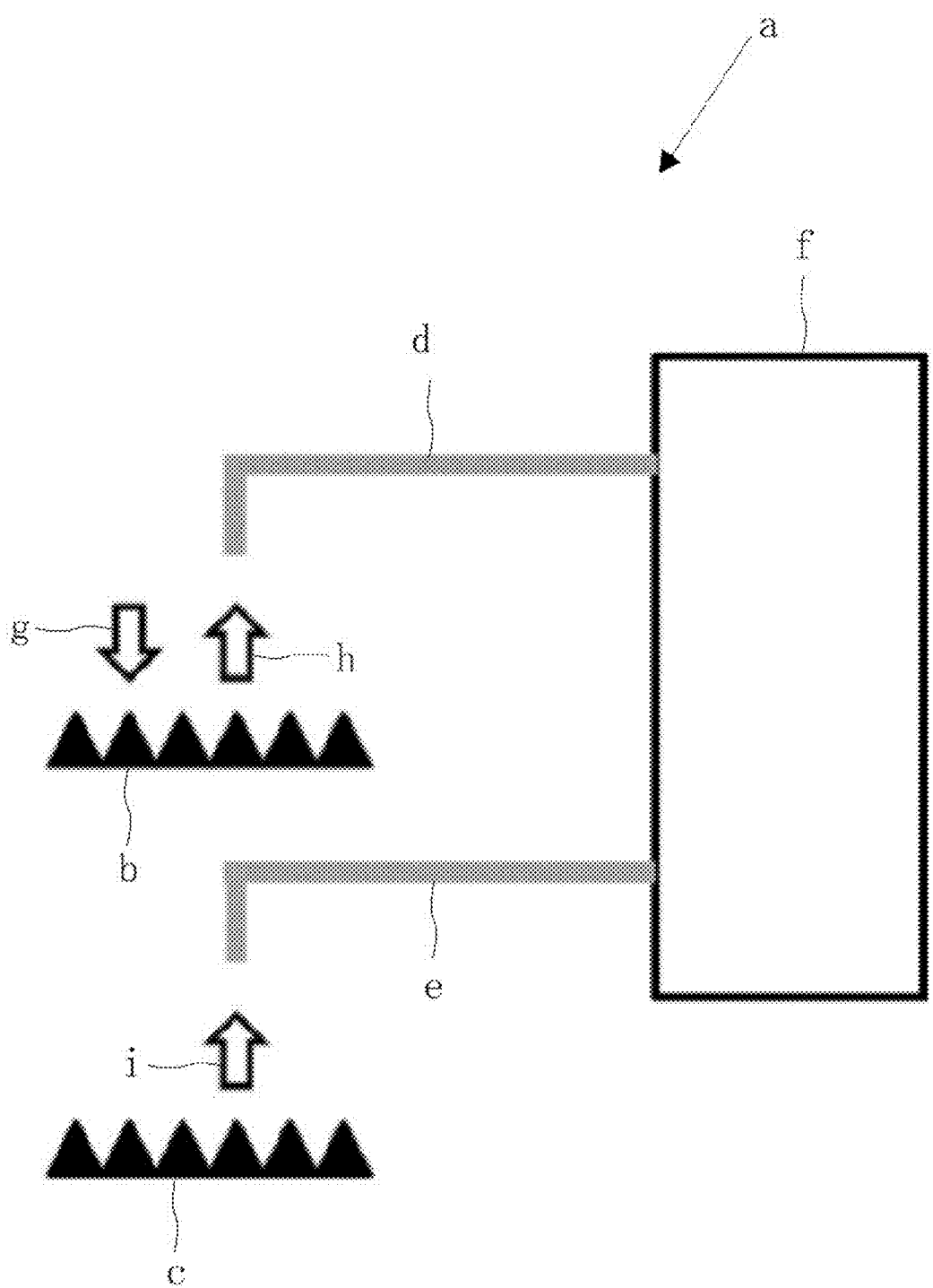

[Fig.2]
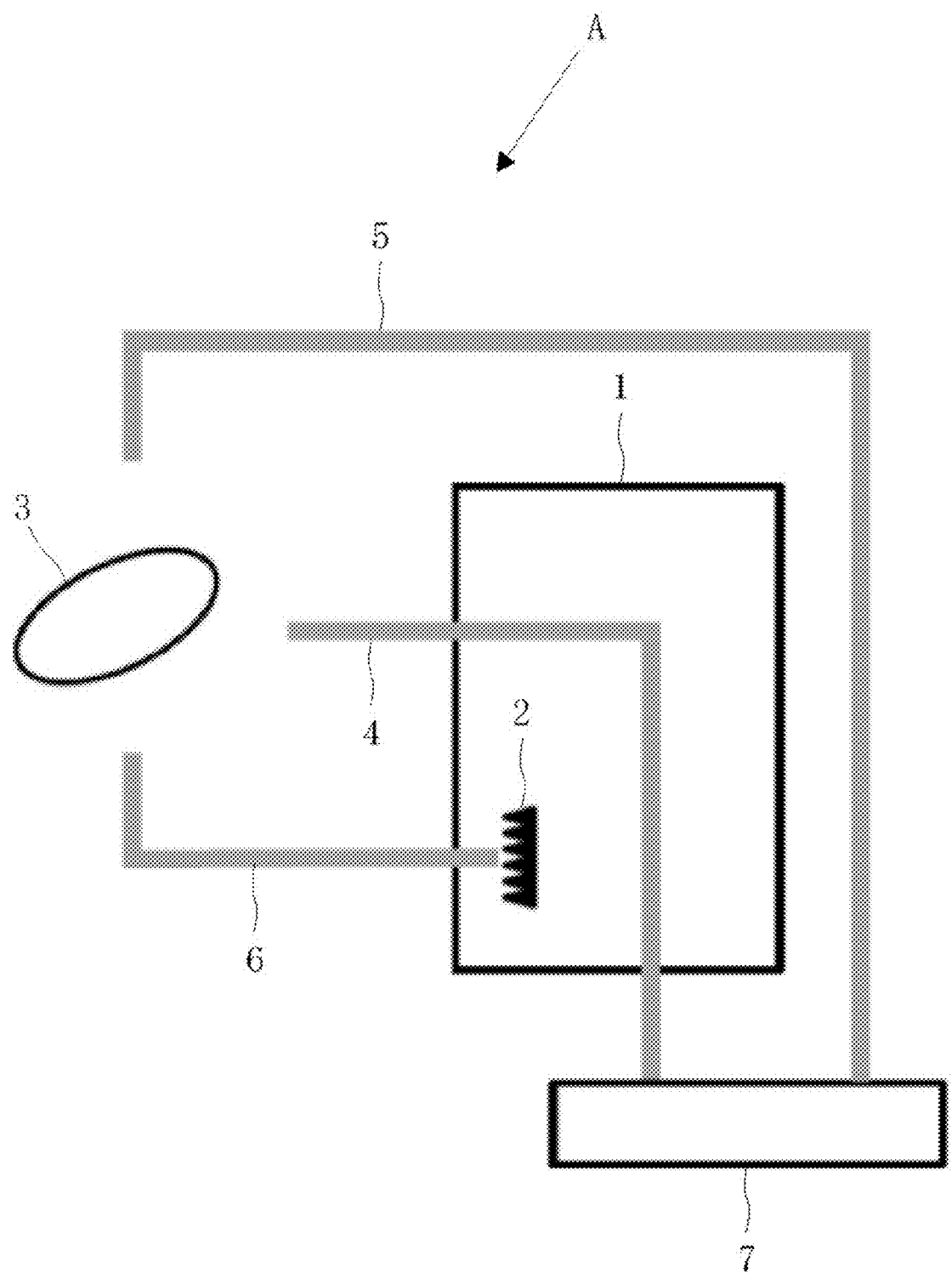

[Fig.3]
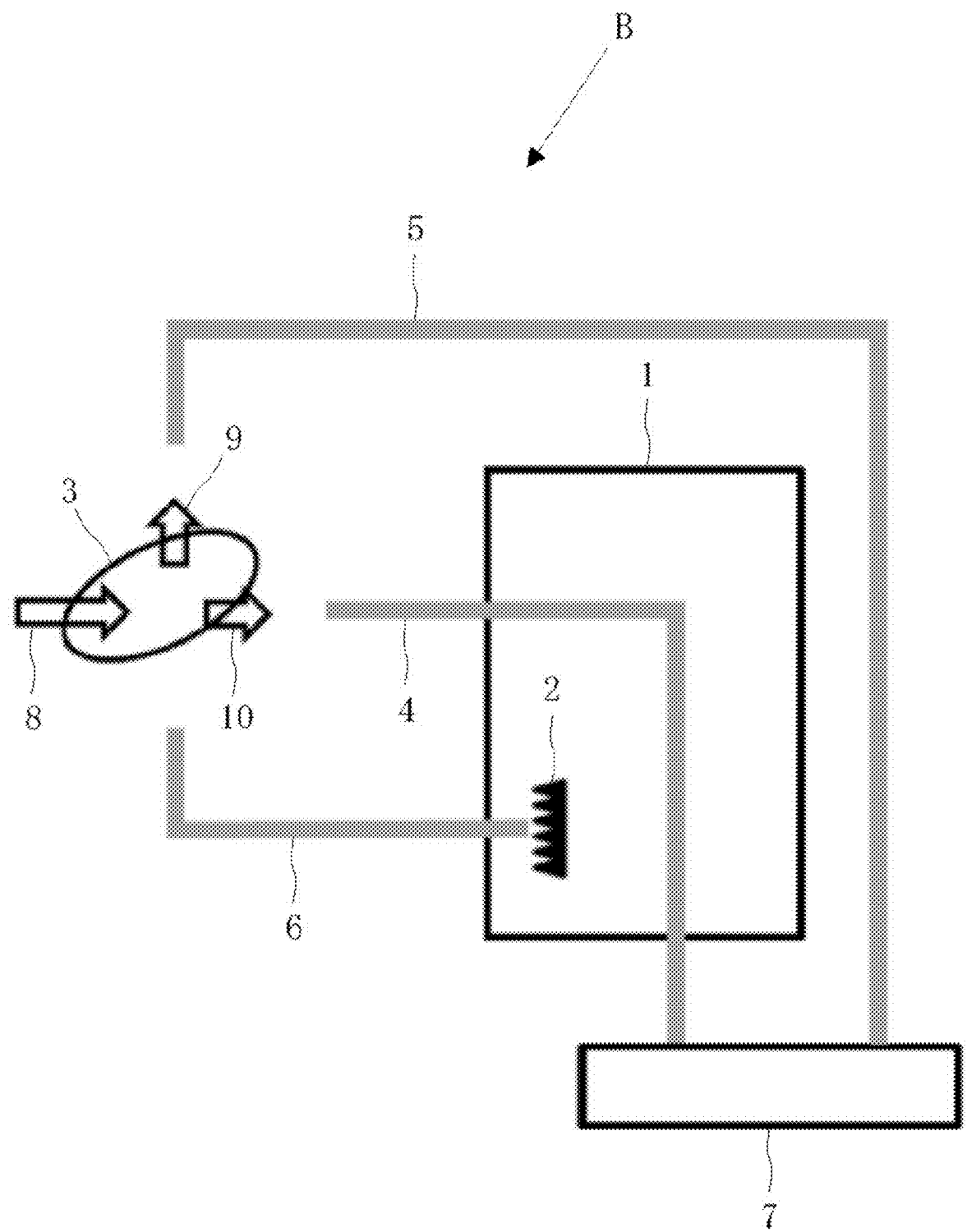

[Fig.4]
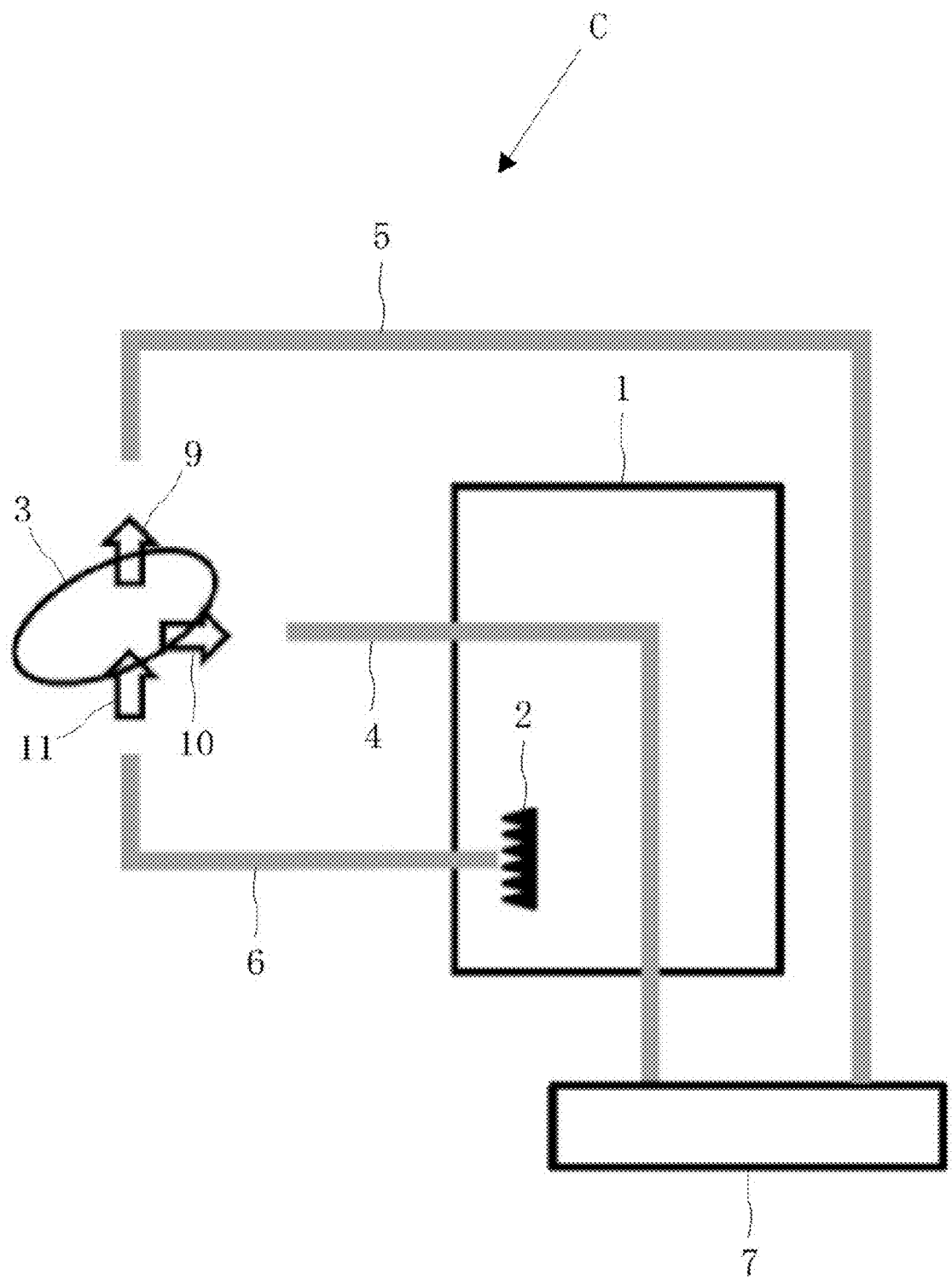

RADIOMETRY DEVICE

TECHNICAL FIELD

The present invention relates to a radiometry device. More specifically, the present invention relates to a radiometry device that uses a blackbody in a quasi-thermal equilibrium state at an ultralow temperature in vacuo in order to measure the temperature of radiation of an object (radiator) present in nature (called graybody radiation) (abbreviated as radiator temperature), and accurately measures the radiator temperature by calibrating the temperature of the radiator according to two-color thermometry based on Planck's formula.

BACKGROUND ART

As methods and devices that measure the radiator temperature in a non-contact manner, for example, Patent Literatures 1 to 4 and Non Patent Literature 1 have been known.

Patent Literature 1 discloses a method of obtaining the radiator temperature by splitting the radiation from a radiator into two polarized components, measuring the respective spectral radiances $L_1$ and $L_2$, and compensating the effect of background light using the emissivities $\varepsilon_{1t}$ and $\varepsilon_{2t}$ of the respective polarized components measured in an offline state without receiving background light.

Patent Literature 2 discloses that the infrared light of radiation from a radiator is allowed to transmit through an infrared filter and then polarized by a first polarizer, subsequently the polarized radiation is separated by an electro-optical element into two polarized components orthogonal to each other while being harmonically amplitude-modulated, and the temperature is obtained by a numerical analyzer on the basis of the harmonic amplitude ratio and a preliminarily prepared calibration search table.

Patent Literature 3 discloses that a comb generator is set in a cryo-environment, a normal temperature blackbody and a cryogenic blackbody (a blackbody soaked in liquid nitrogen) are disposed to face each other, microwaves are temperature-calibrated. The literature does not refer to setting of the blackbody in the cryo-environment at all.

Patent Literature 4 discloses that a normal temperature blackbody and a cryogenic blackbody (a blackbody soaked in liquid nitrogen) are separately prepared, and microwaves are temperature-calibrated.

Non Patent Literature 1 discloses that a normal temperature blackbody and a cryogenic blackbody (a blackbody soaked in liquid nitrogen) are prepared, their respective emissions of radiation are caused to enter a detector through a chopper wheel in a normal temperature and a mixer-preamplifier in an ultralow temperature, and the radiator temperature is measured.

Unfortunately, the above methods are methods of measuring radiation while being directly or indirectly affected by disturbances due to the external environment. In particular, the normal temperature blackbody is always affected by variation in temperature, and the cryogenic blackbody is disturbed by the thermal radiation or thermal oscillation at 77 K, which is the boiling point of liquid nitrogen. Consequently, there is a problem in that accurate measurement of the radiator temperature is difficult.

CITATION LIST

Patent Literature

[Patent Literature 1] Japanese Patent Laid-Open No. 2007-107935

[Patent Literature 2] National Publication of International Patent Application No. 2005-505744

[Patent Literature 3] Japanese Patent Laid-Open No. 2003-57274

[Patent Literature 4] US20140035779A1

Non Patent Literature

[Non Patent Literature 1] A. R. Kerr et al., Measurement of gain compression in SIS mixer receives, ALMA Memo 460.1, 15 May 2003

SUMMARY OF INVENTION

Technical Problem

As with the above description, according to measurement of the radiator temperature through the conventional radiometer, it is difficult to measure the radiator temperature accurately even through a radiometer using 77 K blackbody. In view of the above situations, the present invention has an object to provide a radiometry device that accurately measures the radiator temperature.

Solution to Problem

Principle of Present Invention

Measurement of radiation using a blackbody is based on a principle that measurement of radiation emitted from an object that completely absorbs radiation in all frequencies (the object is called a blackbody) can measure the same radiation as radiation absorbed by the blackbody. The blackbody in a thermal equilibrium state emits the same radiation as the absorbed radiation. Consequently, use of the blackbody in the thermal equilibrium state allows the radiator temperature to be known.

However, the blackbody is a virtual object and is not actually present, and there is no complete thermal equilibrium state in actuality. Consequently, it is impossible to know actually the radiator temperature (the blackbody temperature defined by Planck's formula) using the virtual blackbody.

Accordingly, the present invention provides a radiometry device that uses an object similar to a blackbody (the object is called a "blackbody" in the present invention), and brings the object into a state (called a quasi-thermal equilibrium state) close as much as possible to a thermal equilibrium state at an ultralow temperature in vacuo, thereby accurately measuring the radiator temperature.

The present invention is a radiometry device that separates radiation from an object (also called "radiator") into polarized light beams, measure a separated one as a first radiance at a first frequency, measures the other as a second radiance at a second frequency, sets a blackbody in the vacuum ultralow temperature thermostatic chamber to achieve a quasi-thermal equilibrium state at an ultralow temperature in vacuo, separates radiation emitted from the blackbody into polarized light beams in a manner similar to the above description, and, in a manner similar to the above description, guides a separated one to the same optical path as that for the first frequency and measures the one as a third radiance at the first frequency, guides the other to the same optical path as that for the second frequency and measures the other as a fourth radiance at the second frequency, and calibrates a ratio between the measured first radiance and second radiance using a ratio between the third radiance and the fourth radiance.

More specifically, (1)

A radiometry device includes:

a vacuum ultralow temperature thermostatic chamber that keeps an inside at an ultralow temperature in vacuo;

a first optical path that amplifies radiation at a first frequency;

a blackbody provided in the vacuum ultralow temperature thermostatic chamber;

a second optical path that amplifies radiation at a second frequency;

a polarization filter that is provided outside of the vacuum ultralow temperature thermostatic chamber and separates radiation into polarized light beams;

a third optical path through which radiation from the blackbody enters the polarization filter; and a spectrum analyzer that analyzes a signal having passed through the first optical path and the second optical path, wherein the blackbody in the vacuum ultralow temperature thermostatic chamber is kept in a quasi-thermal equilibrium state at an ultralow temperature of 30 K or lower in vacuo of $10^{-4}$ Pa or lower, when the polarization filter receives radiation of an object, the radiation of the object is separated by the polarization filter into polarized light beams, and a separated one is allowed to enter the first optical path, and another is allowed to enter the second optical path simultaneously, and when the polarization filter receives the radiation of the blackbody through the third optical path, the radiation of the blackbody is separated by the polarization filter into polarized light beams, and a separated one is allowed to enter the first optical path, and another is allowed to enter the second optical path simultaneously, a first radiance of the radiation of the object at the first frequency is measured according to procedures of the polarization filter→the first optical path→the spectrum analyzer, a second radiance of the radiation of the object at the second frequency is measured according to procedures of the polarization filter→the second optical path→the spectrum analyzer, a third radiance of the radiation of the blackbody at the first frequency is measured according to procedures of the polarization filter→the first optical path→the spectrum analyzer, a fourth radiance of the radiation of the blackbody at the second frequency is measured according to procedures of the polarization filter→the second optical path→the spectrum analyzer, a ratio between the first radiance and the second radiance measured by the corresponding procedures is calibrated using a ratio between the third radiance and the fourth radiance to thereby obtain a measured value $T_2$ of a temperature of the object to be measured using the blackbody, a temperature error $\Delta T$ ($=T_1-T_2$) between a temperature (a temperature of the blackbody defined by Planck's formula) $T_1$ of the object to be obtained and the measured value $T_2$ measured using the blackbody decreases inversely proportional to a temperature ratio $t_1/t_2$ between an absolute temperature $t_1$ of the object and an absolute temperature $t_2$ of the blackbody to be used, and reduction in the temperature of the blackbody to be used improves an effect of reducing the temperature error, and allows accurate measurement of the temperature of the object to be obtained.

(2)

The radiometry device according to (1), wherein the first optical path is provided in the vacuum ultralow temperature thermostatic chamber.

(3)

The radiometry device according to (1), wherein the second optical path is provided outside of the vacuum ultralow temperature thermostatic chamber.

(4)

The radiometry device according to (1), wherein the polarization filter, the first optical path, and the second optical path are arranged so that the polarization filter can rotate to switch polarized light output destinations between a case where the polarization filter receives the radiation of the object and a case where the radiation of the blackbody is received after the third optical path.

Advantageous Effects of Invention

The present invention calibrates the temperature of an object using a blackbody in a quasi-thermal equilibrium state at an ultralow temperature in vacuo. Consequently, the present invention can accurately measure the temperature of the object without adverse effects of disturbances affecting the object, and can achieve highly reliable measurements.

In particular, maintaining the blackbody in vacuo of $10^{-4}$ Pa or lower and at an ultralow temperature of 30 K or lower can reduce, to 1/10 or less, the temperature error between the measured temperature of the radiator (object) and the temperature of the object to be obtained (i.e., the temperature of the blackbody defined by Planck's formula).

BRIEF DESCRIPTION OF DRAWINGS

FIG. 1 is a schematic diagram illustrating a structure of a conventional radiometry device using a normal temperature blackbody and a cryogenic blackbody.

FIG. 2 is a schematic diagram illustrating a structure of a radiometry device of the present invention.

FIG. 3 is a diagram illustrating procedures for measuring radiation of an object through the radiometry device of the present invention.

FIG. 4 is a diagram illustrating procedures for measuring blackbody radiation through the radiometry device of the present invention.

DESCRIPTION OF EMBODIMENTS

Hereinafter, referring to the accompanying drawings, embodiments of the present invention are described in detail. It should be noted that the present invention is not limited to the embodiments described below.

First, a conventional art is herein described. FIG. 1 shows a conventional radiometry device a that uses a normal temperature blackbody b and a cryogenic blackbody c. Radiation g from an object is received by the normal temperature blackbody b. Radiation h of the normal temperature blackbody b passes through an optical path d for normal temperature blackbody radiation and enters a spectrum analyzer f, and the radiance is measured thereat. Meanwhile, radiation i of the cryogenic blackbody c passes through an optical path e for cryogenic blackbody radiation and enters the spectrum analyzer f, and the radiance is measured thereat.

Unfortunately, the normal temperature blackbody b is always affected by the disturbances of the external environment where this blackbody is placed. The cryogenic blackbody c is used for reducing the adverse effect. However, the cryogenic blackbody c itself is also exposed to disturbances at 77 K, which is the boiling point of liquid nitrogen. Accordingly, there is a logical contradiction that the temperature calibration of the uncertain normal temperature blackbody b is performed using the uncertain cryogenic blackbody c. Consequently, this method is unsuitable for accurate measurement of the radiator temperature in a strict sense.

Embodiment 1

FIG. 2 is a schematic diagram of a radiometry device of the present invention. The radiometry device A of the present invention includes: a vacuum ultralow temperature thermostatic chamber 1 that keeps the inside at an ultralow temperature in vacuo; a first optical path 4 that is provided in the vacuum ultralow temperature thermostatic chamber 1 and amplifies radiation at a first frequency; a blackbody 2 provided in the vacuum ultralow temperature thermostatic chamber 1; a second optical path 5 that is provided outside of the vacuum ultralow temperature thermostatic chamber 1 and amplifies radiation at a second frequency; a polarization filter 3 that is provided outside of the vacuum ultralow temperature thermostatic chamber 1 and separates the radiation into polarized light beams; a third optical path 6 through which radiation from the blackbody 2 enters the polarization filter 3; and a spectrum analyzer 7 that analyzes a signal having passed through the first optical path 4 and the second optical path 5.

Then,
the blackbody 2 placed in the vacuum ultralow temperature thermostatic chamber 1 is kept in a quasi-thermal equilibrium state at an ultralow temperature in vacuo,
the polarization filter 3, the first optical path 4, and the second optical path 5 are arranged so that
when the polarization filter 3 receives radiation of an object, the radiation of the object can be separated by the polarization filter 3 into polarized light beams, and a separated one can be allowed to enter the first optical path 4, and
the other one can be allowed to enter the second optical path 5 simultaneously,
and
the polarization plane of the polarization filter is arranged to be switchable so that when the polarization filter 3 receives the radiation of the blackbody 2 through the third optical path 6,
the radiation of the blackbody 2 can be separated by the polarization filter 3 into polarized light beams, and a separated one can be allowed to enter the first optical path 4, and
the other can be allowed to enter the second optical path 5 simultaneously,
a first radiance of the radiation of the object at the first frequency is measured according to procedures of the polarization filter 3→the first optical path 4→the spectrum analyzer 7,
a second radiance of the radiation of the object at the second frequency is measured according to procedures of the polarization filter 3→the second optical path 5→the spectrum analyzer 7,
meanwhile,
a third radiance of the radiation of the blackbody 2 at the first frequency is measured according to procedures of the polarization filter 3→the first optical path 4→the spectrum analyzer 7,
a fourth radiance of the radiation of the blackbody 2 at the second frequency is measured according to procedures of the polarization filter 3→the second optical path 5→the spectrum analyzer 7, thereby
calibrating the ratio between the radiances of the radiation of the object at the two frequencies using the radiances of the radiation of the blackbody in the quasi-thermal equilibrium state at the ultralow temperature in vacuo at the two frequencies.

Keeping of the blackbody in the quasi-thermal equilibrium state at the ultralow temperature in vacuo according to the present invention means that the molecular motion of the blackbody is brought into the quasi-thermal equilibrium state at the ultralow temperature in vacuo being hardly affected by disturbances, and the state is kept. The atoms and molecules of a blackbody at 77 K, which is the boiling point of liquid nitrogen, are still actively, thermally moving and thermally oscillating. Accordingly, the atoms and molecules are in a state susceptible to disturbances. It is difficult to achieve absolute zero, at which the motions of atoms and molecules of substances are zero.

Accordingly, the present invention brings the blackbody in an environment at an ultralow temperature in vacuo in order to achieve a quasi-thermal equilibrium state, where the motions of atoms and molecules of the blackbody are hardly affected by disturbances. Consequently, in cases of temperature calibration using a blackbody at the same cryogenic temperature, temperature calibration using the blackbody in the quasi-thermal equilibrium state at the ultralow temperature in vacuo according to the present invention is significantly accurate temperature calibration and has higher reliability, in comparison with conventional temperature calibration using a cryogenic blackbody in a normal pressure.

The blackbody is brought into the environment at the ultralow temperature in vacuo by placing the blackbody in the vacuum ultralow temperature thermostatic chamber. To achieve significantly accurate temperature calibration, it is preferable that the blackbody in the vacuum ultralow temperature thermostatic chamber be kept in a quasi-thermal equilibrium state at an ultralow temperature of 30 K or lower in vacuo of $10^{-4}$ Pa or lower.

The vacuum ultralow temperature thermostatic chamber according to the present invention is a thermostatic chamber with the inside being kept at an ultralow temperature in vacuo. It is difficult to bring the vacuum into absolute vacuum in actuality. However, it is possible to achieve a vacuum close to absolute vacuum as much as possible. This is because achievement of the vacuum in the vacuum ultralow temperature thermostatic chamber is most effective in eliminating the effect of external disturbances. Achievement of the ultralow temperature in the vacuum ultralow temperature thermostatic chamber is for preventing, as much as possible, effects of thermal disturbances on the optical paths, the blackbody and the like provided in the vacuum ultralow temperature thermostatic chamber.

Such configuration can bring the blackbody in the vacuum ultralow temperature thermostatic chamber into a state (called a quasi-thermal equilibrium state) close to the thermal equilibrium state as much as possible. It is preferable that the vacuum in the vacuum ultralow temperature thermostatic chamber range from $10^{-4}$ Pa to a higher vacuum (hereinafter also called a vacuum of $10^{-4}$ Pa or lower). It is further preferable that the vacuum range from $10^{-5}$ Pa to a higher vacuum.

The temperature in the vacuum ultralow temperature thermostatic chamber is kept at an ultralow temperature. The ultralow temperature in the present invention is a temperature less than 77 K, which is the boiling point of liquid nitrogen. It is preferable that the temperature be 30 K or lower. It is further preferable that the temperature be 10 K or lower. Ultralow temperature cooling in the vacuum ultralow temperature thermostatic chamber can be achieved by installing a coolant-free refrigerator in the vacuum ultralow temperature thermostatic chamber.

In a case of measurement of the temperature of an object using the blackbody in the quasi-thermal equilibrium state according to the present invention, it is assumed that the absolute temperature of the object is $t_1$, and the absolute temperature of the blackbody to be used is $t_2$. It is unexpectedly understood that the temperature error $\Delta T$ $(=T_1-T_2)$ between the temperature (the temperature of the blackbody defined by Planck's formula) $T_1$ of the object to be obtained and the measured value $T_2$ of the temperature of the object to be measured using the blackbody can be reduced inversely proportional to the temperature ratio $t_1/t_2$ between the absolute temperature $t_1$ of the object and the absolute temperature $t_2$ of the blackbody to be used. Hereinafter, this is called an effect of reducing the temperature error.

Consequently, according to the present invention, since reduction in the temperature of the blackbody to be used improves the effect of reducing the temperature error, the temperature of the object to be obtained can be accurately measured. Conventionally, a blackbody of up to 77 K, which is the boiling point of liquid nitrogen at a normal pressure, has been used. Consequently, the effect of reducing the temperature error for a blackbody in a quasi-thermal equilibrium state at an ultralow temperature of 77 K or lower in vacuo has been in an unpredictable unexplored area. In particular, according to the present invention, the blackbody kept at an ultralow temperature of 30 K or lower in vacuo of $10^{-4}$ or lower significantly achieves the effect of reducing the temperature error.

As described above, provided that the temperature error between the temperature measured using the normal temperature blackbody and the temperature of the object to be obtained is $\Delta T$ and the blackbody of the present invention is kept at $10^{-4}$ Pa-30 K or at $10^5$ Pa-10 K, $\Delta T$ can be reduced further to 1/10 or 1/30. For example, it is assumed that when the temperature of the object is measured using only the normal temperature blackbody, the temperature error between the measured temperature of the object and the temperature of the object to be obtained is 10 K. The temperature error between the measured temperature of the object measured using the normal temperature blackbody in the conventional method and the blackbody at 77 K, which is the boiling point of liquid nitrogen, and the temperature of the object to be obtained ranges from about 2.5 K to about 10 K.

On the other hand, in the case of measurement using the blackbody at $10^{-4}$ Pa-30 K of the present invention, the temperature error between the measured temperature of the object and the temperature of the object to be obtained can be about 1 K. In the case of measurement using the blackbody at $10^{-5}$ Pa-10 K, the temperature error can be about 0.3 K.

The first optical path and the second optical path are configured as optical paths for selectively capturing and amplifying only the radiation components at the first frequency and the second frequency, which are contained in the radiation, because the radiation is often significantly weak and the radiation components at the frequencies are amplified prior to radiation measurement.

The first frequency of the first optical path and the second frequency of the second optical path may be different frequencies, or may be the same frequency. For example, in a case where the object is a cloud, it is typically preferable that the first frequency and the second frequency be 20 and 60 GHz, respectively.

To capture selectively only a radiation component at a certain frequency contained in radiation, an optical filter is typically used. As for the optical filter, various optical filters, such as a bandpass filter, a lens filter, thin-film optics, and a dichroic mirror, have been known. Accordingly, the filters may be appropriately used. To amplify the radiation at the frequency, a low-noise amplifier may typically be used.

The polarization filter 3 is an optical device for separating radiation into polarized light beams in different traveling directions. Preferably, a wire grid is used as the polarization filter. Without rotation of a large-sized radiometry device, polarization in the measurement direction can be achieved in a short time (1 Hz level). Besides control of the traveling direction of the polarized light beam by rotation of the polarization filter, control may be performed such that without rotation of the polarization filter, a reflection mirror is inserted and retracted before or after the polarization filter, the traveling direction of the light entering the polarization filter or the polarized light beam emitted from the polarization filter is switched by rotation or the like.

The blackbody in the quasi-thermal equilibrium state is used because the logically correct temperature of the object can be known according to the principle of cavity radiation on the basis of the measured value of the radiance of the radiation component at the frequency contained in the radiation of the object and the measured value of the radiance of the radiation component at the frequency contained in the radiation of the blackbody in the quasi-thermal equilibrium state. Typically, platinum black, graphite or the like is used as the blackbody.

Referring to FIG. 3, the procedures of measurement B of the radiation of the object through the radiometry device of the present invention are described. The radiation 8 from the object is separated by the polarization filter 3 into polarized wave 9 and polarized wave 10 in different traveling directions.

In FIG. 3, arrangement is made such that the polarized wave 10 enters the first optical path 4, and the polarized wave 9 enters the second optical path 5. The radiation at the first frequency contained in the polarized wave 10 having entered the first optical path 4 is amplified, enters the spectrum analyzer 7, and is output as the first radiance. The radiation at the second frequency contained in the polarized wave 9 having entered the second optical path 5 is amplified, enters the spectrum analyzer 7, and is output as the second radiance.

Referring to FIG. 4, the procedures of measurement C of the blackbody radiation through the radiometry device of the present invention are described. Radiation 11 of the blackbody 2 in the quasi-thermal equilibrium state in an ultralow temperature in vacuo passes through the third optical path 6 and enters the polarization filter 3. One of the polarized light beams separated by the polarization filter 3 enters the first optical path 4, and the radiation component at the first frequency is amplified, enters the spectrum analyzer 7 and is output as the third radiance. Meanwhile, the other of the separated polarized light beams enters the second optical path 5, and the radiation component at the second frequency is amplified, enters the spectrum analyzer 7 and is output as the fourth radiation.

The procedures of obtaining the temperature of the object using the measured values of radiances obtained by the radiometry device of the present invention are described. It is assumed that the radiance of the radiation of the object up to entrance to the polarization filter 3 is U, and the magnitude of perturbation from the path of the polarization filter 3→the first optical path→the spectrum analyzer 7 is ΔP, while the radiance of the radiation of the blackbody 2 up to entrance to the polarization filter 3 is V, and the magnitude of perturbation from the path of the polarization filter 3→the first optical path→the spectrum analyzer 7 is ΔP. The value obtained by subtracting the radiance of the radiation of the blackbody 2 from the measured value of the radiance of the radiation of the object is [U+ΔP]−[V+ΔP]=U−V.

The measurement of radiance through the second optical path is performed in an analogous manner. That is, the radiance of the object and the radiance of the blackbody are measured using the optical system of the present invention, and the radiance of the radiation of the object is calibrated using the radiance of the radiation of the blackbody, thereby allowing the radiance of the radiation of the object to be measured as a value having not been affected by disturbances at all.

The present invention measures the radiances of the radiation from the object at two frequencies. A ratio R thereof is calculated. The ratio R is called a two-color ratio. The temperature of the blackbody providing the two-color ratio is assumed as T. The relationship $\log R = C_3 + C_4/T$ holds according to the principle of the two-color thermometry based on Planck's formula.

Accordingly, the two-color ratio $R_1$ of the radiation of the object and the temperature $T_1$ of the blackbody providing this two-color ratio has a relationship $\log R_1 = C_3 + C_4/T_1$.

The two-color ratio $R_2$ of the blackbody at the temperature $T_2$ in the quasi-thermal equilibrium state and the temperature $T_2$ of the blackbody in the quasi-thermal equilibrium state providing this two-color ratio has a relationship $\log R_2 = C_3 + C_4/T_2$.

Here, $C_3 = 5 \log(\lambda_2/\lambda_1)$, $C_4 = C_2(1/\lambda_2 - 1/\lambda_1)$, $C_2 = ch/k$, and $\lambda_1$ and $\lambda_2$ are wavelengths corresponding to the respective two frequencies. c is the light speed, h is Planck's constant, and k is Boltzmann's constant.

Consequently, $\log R_1 - \log R_2 = C_4(1/T_1 - 1/T_2)$ holds.

The actually measured values $R_1$, $R_2$, $\lambda_1$, $\lambda_2$ and $T_2$ are substituted in this equation, thereby allowing the temperature $T_1$ of the blackbody to be calculated. Here, the principle of the two-color thermometry assumes the temperature of the blackbody as the temperature of the object. Accordingly, the temperature $T_1$ of the blackbody is the temperature of the object. As described above, the obtained temperature of the object represents a value having not been affected by disturbances due to the optical system at all.

The present invention can also obtain the temperature of the object using only the first optical path and the third optical path. The present invention can also obtain the temperature of the object using only the second optical path and the third optical path.

The obtained temperature calibration data on the object can be converted into the kinetic energy of the object by high-speed operation data processing. Furthermore, the motion of the object can be displayed as images on a PC screen. The obtained variation in temperature of the object can also be converted into variation in kinetic energy of the object. Accordingly, accurate temperature measurement by the present invention can display the variation in temperature of the object as variation in motion of the object having significant difference.

INDUSTRIAL APPLICABILITY

The present invention is industrially applicable as a radiometry device used for a radiometer. For example, the application may be a radiometry device mounted on a terahertz test instrument.

REFERENCE SIGNS LIST a Conventional radiometry device
b Normal temperature blackbody
c Cryogenic blackbody
d Optical path of normal temperature blackbody radiation
e Optical path of cryogenic blackbody radiation
f Spectrum analyzer
g Radiation from object
h Radiation
i Radiation
A Radiometry device of present invention
B Measurement of object by radiometry device of present invention
C Measurement of blackbody radiation by radiometry device of present invention
1 Vacuum ultralow temperature thermostatic chamber
2 Blackbody
3 Polarization filter
4 First optical path
5 Second optical path
6 Third optical path
7 Spectrum analyzer
8 Radiation from object
9 Polarized wave
10 Polarized wave
11 Radiation

The invention claimed is:

1. A radiometry device for measuring a temperature of an object, comprising:
a vacuum ultralow temperature thermostatic chamber that keeps an inside at an ultralow temperature in vacuo;
a blackbody provided in the vacuum ultralow temperature thermostatic chamber;
a polarization filter provided outside of the vacuum ultralow temperature thermostatic chamber and configured to receive each of radiation of the object and radiation of the blackbody and to separate each of the radiations into first and second polarized light beams;
a first optical path through which the first polarized light beam from the polarization filter passes and configured to amplify the radiation of the first polarized light beam at a first frequency;
a second optical path through which the second polarized light beam from the polarization filter passes and configured to amplify the radiation of the second polarized light beam at a second frequency;
a third optical path through which the radiation from the blackbody passes, which enters the polarization filter; and
a spectrum analyzer configured to measure each radiance of the first and second polarized lights which have passed through the first optical path and the second optical path, respectively,
wherein the radiometry device is configured such that the blackbody in the vacuum ultralow temperature thermostatic chamber is kept in a quasi-thermal equilibrium state at an ultralow temperature of 30 K or lower in vacuo of $10^{-4}$ Pa or lower, the radiance of the radiation of the object at the first frequency is measured as a first radiance, the radiance of the radiation of the object at the second frequency is measured as a second radiance, the radiance of the radiation of the blackbody at the first frequency is measured as a third radiance, the radiance of the radiation of the blackbody at the second frequency is measured as a fourth radiance, and a ratio between the first radiance and the second radiance is calibrated using a ratio between the third radiance and the fourth radiance to obtain the temperature of the object based on the calibrated ratio.

2. The radiometry device according to claim 1, wherein the first optical path is provided in the vacuum ultralow temperature thermostatic chamber.

3. The radiometry device according to claim 1, wherein the second optical path is provided outside of the vacuum ultralow temperature thermostatic chamber.

4. The radiometry device according to claim 1, wherein the polarization filter, the first optical path, and the second optical path are arranged such that the polarization filter can rotate to switch directions of the polarized light passing through the polarization filter between a case where the polarization filter receives the radiation of the object and a case where the polarization filter receives the radiation of the blackbody from the third optical path.

\* \* \* \* \*